United States Patent [19]
Williamson et al.

[11] Patent Number: 5,572,515
[45] Date of Patent: Nov. 5, 1996

[54] SONET/SDH SIGNAL RECOGNITION AND SELECTION

[75] Inventors: Alistair Williamson; Robert J. Woolridge, both of Portland, Oreg.

[73] Assignee: Tektronix, Inc., Wilsonville, Oreg.

[21] Appl. No.: 366,078

[22] Filed: Dec. 28, 1994

[51] Int. Cl.⁶ .............................. H04J 3/14; H04J 14/08
[52] U.S. Cl. .................. 370/17; 370/84; 370/99
[58] Field of Search .................... 370/13, 16, 82, 370/84, 112, 100.1, 105.1, 102, 99; 371/20.1, 20.4, 20.5; 359/110, 115, 118–121

[56] References Cited

U.S. PATENT DOCUMENTS

| | | | |
|---|---|---|---|
| 5,251,204 | 10/1993 | Izawa et al. | 370/13 |
| 5,335,223 | 8/1994 | Iino | 370/84 |
| 5,369,653 | 11/1994 | Kuroda | 370/84 |
| 5,432,796 | 7/1995 | Borschel et al. | 371/20.4 |
| 5,434,890 | 7/1995 | Kimura et al. | 370/105.1 |
| 5,455,832 | 10/1995 | Bowmaster | 371/20.1 |

OTHER PUBLICATIONS

*T-BERD 310 Communications Analyzer Sales Brochure,* Tele communications Techniques Corp., 1991.
*SF-60 PDH/SDH Error and Jitter Analyzer Operating Manual,* Wandel & Golterman, 1993, pp. 3–101 through 3–104.

*Primary Examiner*—Douglas W. Olms
*Assistant Examiner*—Seema Rao
*Attorney, Agent, or Firm*—William K. Bucher; Brent Logan

[57] ABSTRACT

System for automatic signal recognition and selection in a Synchronous Optical Network (Sonet) and Synchronous Digital Hierarchy (SDH) signal. The system automatically looks for signal location, signal rate, signal structure, signal payload mapping, and signal test patterns and displays the results in a matrix form. A user is allowed to select a specific channel within a specific structure, thereby setting the instrument's receiver.

21 Claims, 10 Drawing Sheets

SONET/SDH SIGNAL RECOGNITION AND SELECTION

TECHNICAL FIELD

The invention relates generally to the field of digital signal test and measurement and more particularly to a system for determining the type and selecting portions of a Sonet/SDH signal.

BACKGROUND ART

The Synchronous Optical Network (Sonet) and Synchronous Digital Hierarchy (SDH) are standards for protocols for delivering digital data at high rates. These standards cover many of the layers of the OSI Reference Model.

The Sonet/SDH standards comprise a variety of signal rates, signal structures and mappings. An instrument that measures various parameters of a Sonet/SDH signal must be correctly configured to provide meaningful results.

Current Sonet/SDH test instruments require a user to know the current configuration of a Sonet/SDH signal in order to configure the instrument. However, in many test situations, the fact that a component of the signal is not as expected is what is causing communication problems and is why the instrument is needed. In such a case, the user must have a thorough knowledge of the Sonet/SDH standards and know why certain errors occur to properly configure the instrument.

There have been instrument that attempted to automate certain portions of an instrument's configuration. These automatic configurations operated at only a single layer of the Sonet/SDH signal hierarchy. For example, one instrument can determine the signal's data rate, but cannot determine the structure or the mapping. Another instrument assumes that it is correctly configured and automatically checks the specified tributary channels for error states.

DISCLOSURE OF THE INVENTION

It is therefore an object of the present invention to automatically configure an instrument to correctly receive a Sonet/SDH signal.

It is another object to visually display the various layers of a Sonet/SDH signal.

It is another object to allow the user to move between the various layers of a Sonet/SDH signal and select structures and channels of interest for analysis.

According to the present invention, the foregoing and other objects and advantages are attained by scanning signal rates until a framed signal is located. Once the signal rate has been determined, the structure of the signal is determined by reading the pointers in the line/section overhead. The mapping of a specific synchronous payload envelope (SPE)/ virtual container (VC) is determined by reading the path signal label in the path overhead. The receiver is configured to receive a selected SPE/VC signal at the determined rate.

In accordance with an aspect of the invention the information in the path signal label can be verified or expanded by attempting to receive a selected tributary signal at various tributary rates.

As a feature of the invention, the signal rate, structure, and mapping can be displayed in a graphical form, allowing the user to easily select a specific SPE/VC signal for further analysis.

As another feature of the invention, a specified payload can be displayed in graphical form, allowing the user to easily select a channel for further analysis.

These and other features, advantages, and objects of the present invention will become apparent to those skilled in the art upon examination of the following specification when taken in conjunction with the drawings.

DETAILED DESCRIPTION OF THE INVENTION

The CTS 710 SONET Test Set and the CTS 750 SDH Test Set available from Tektronix, Inc., of Wilsonville, Oreg. include embodiments of the invention, and in general, their implementations are described herein.

Figure 1:
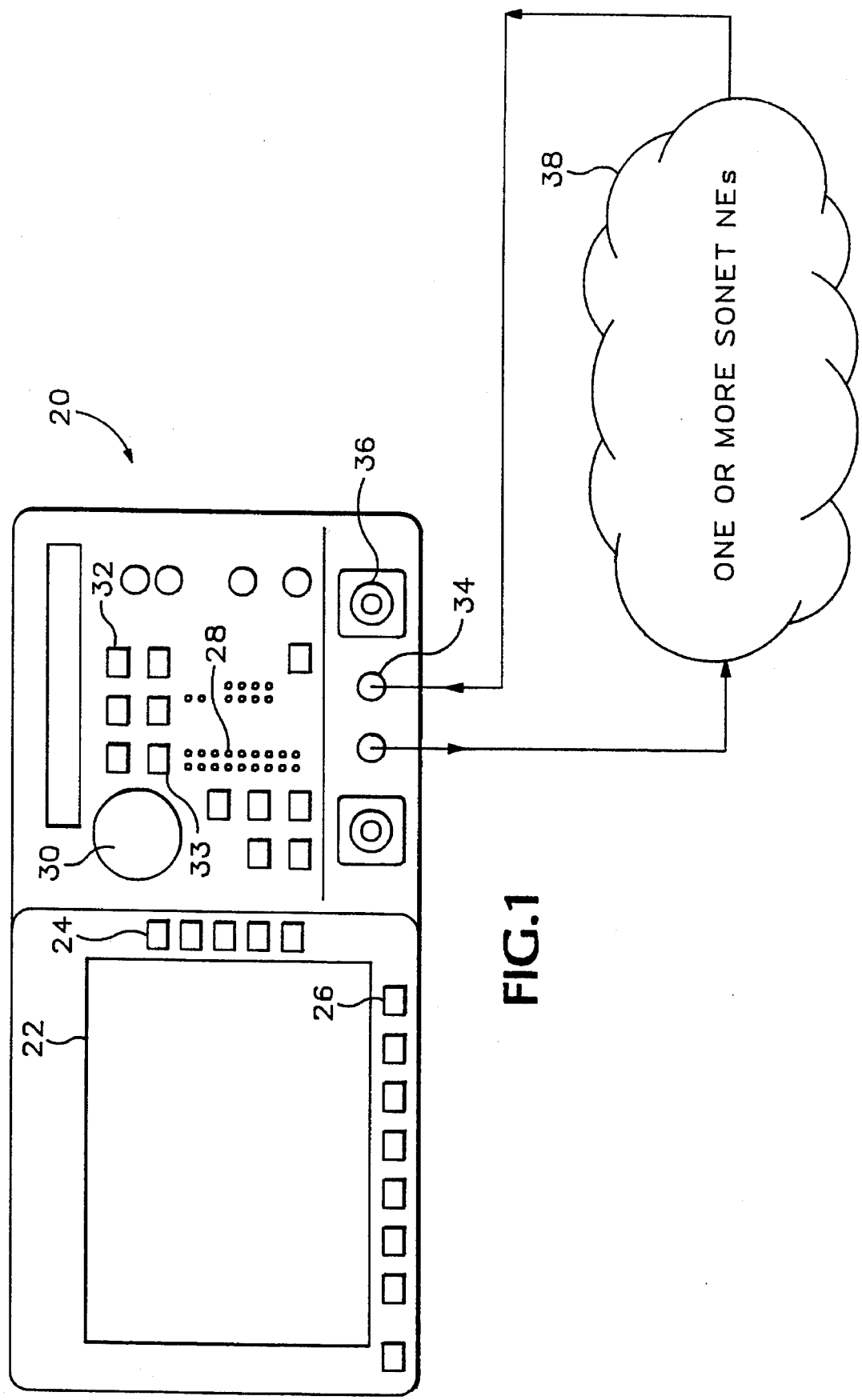
FIG. 1 is a front view of a Sonet/SDH test set connected in a typical test environment.

Referring now to the drawings, and particularly to FIG. 1, a preferred embodiment of a Sonet/SDH test set ("instrument") 20 including the present invention includes a display 22 with associated soft keys 24, 26, status indicators 28, input knob 30, control buttons 32, and optical and electrical signal connectors 34, 36. One of the buttons is an "autoscan" button 33, which initiates the signal recognition and selection of the present invention. The instrument is connected to a Sonet/SDH network 38.

Figure 2:
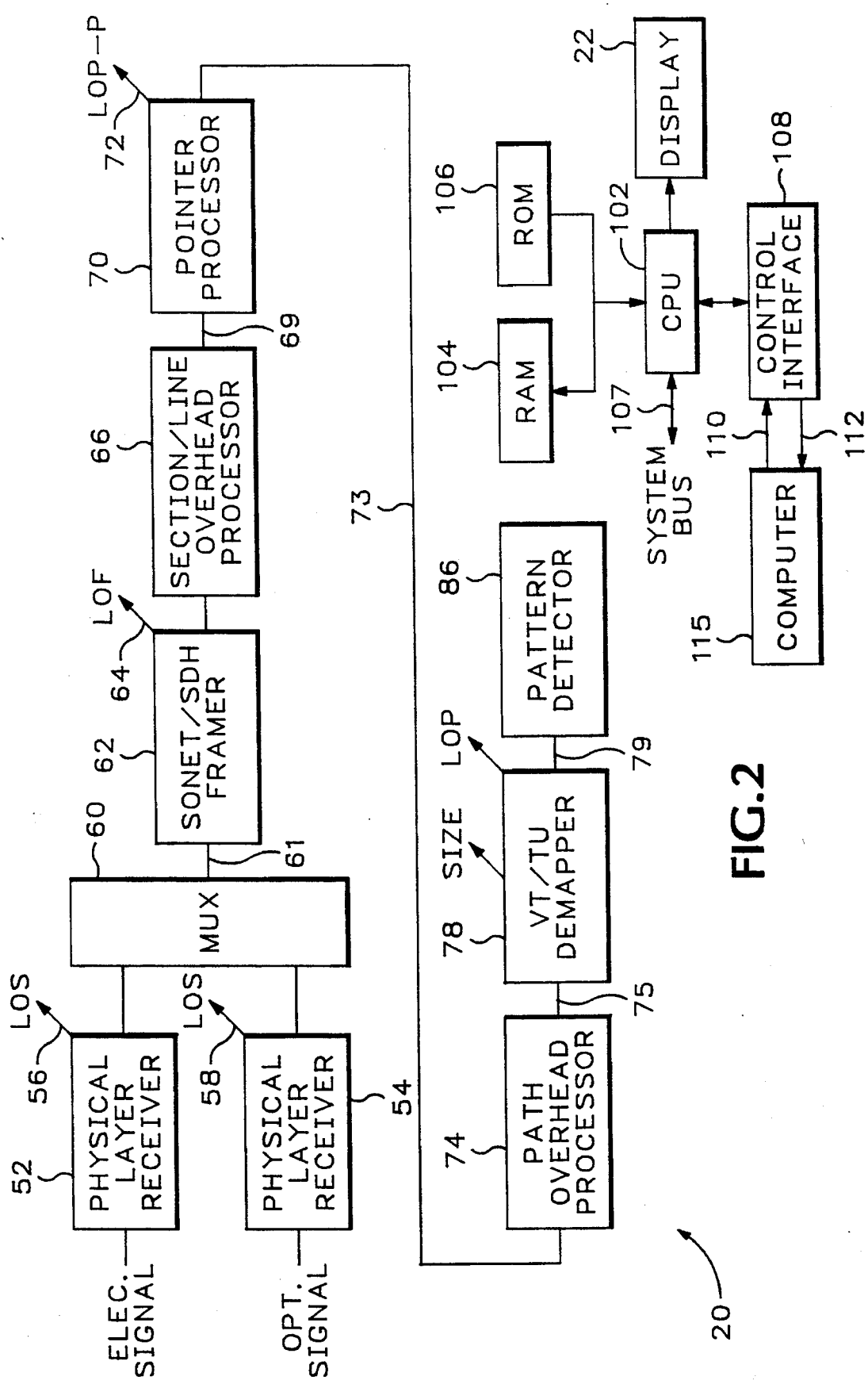
FIG. 2 is a functional block diagram of the Sonet/SDH test set shown in FIG. 1.

Referring to FIG. 2, the instrument 20 includes respective physical layer receivers 52, 54 for the optical receiver connector 34 and the electrical receiver connector 36. The physical layer receivers 52, 54 detect Loss of Signal (LOS) defects in the incoming signal as defined in Section 8.1.2.1.1 Loss of Signal (LOS) of "Layer 1 In-Service Digital Transmission Performance Monitoring," (April 1993) (T1M1.3/ 93-005R1) published by the American National Standards Institute ("T1M1"). That is, when there are no transitions on the incoming signal (before descrambling) for 2.3 to 100 microseconds, the receivers provide LOS signals 56 and 58.

The physical layer receivers 52, 54, pass the received signal to a Sonet/SDH framer 62 via a multiplexer (MUX) 60.

The Sonet/SDH framer 62 determines whether its input signal 61 is a valid Sonet/SDH signal. If the framer 62 detects a Loss of Frame (LOF) failure as defined by section 8.2.1.2.1 of T1M1, it provides a Loss Of Frame (LOF) signal 64.

A section/line overhead processor 66, although part of a typical Sonet/SDH instrument, is not used in the present invention.

A pointer processor 70 takes the signal 69 from the section/line overhead processor 66 and analyzes the H1 and H2 bytes in the section/line overhead. If the pointer processor 70 detects a Loss of Pointer (LOP-P) defect as defined by section 8.1.2.4.1 of T1M1, it provides a LOP-P signal 72. The pointer processor extracts from the signal 69 a selected synchronous payload envelope (SPE) or virtual container (VC).

A path overhead processor 74 takes the SPE/VC signal 73 from the pointer processor 70 and extracts from it the C2 byte in the path overhead portion.

A VT/TU demapper 78 receives the SPE/VC signal 75 from the path overhead processor 74 and extracts a specified channel contained within it.

The VT/TU demapper 78 provides the extracted channel signal 79 to a pattern detector 86.

Figure 3A:
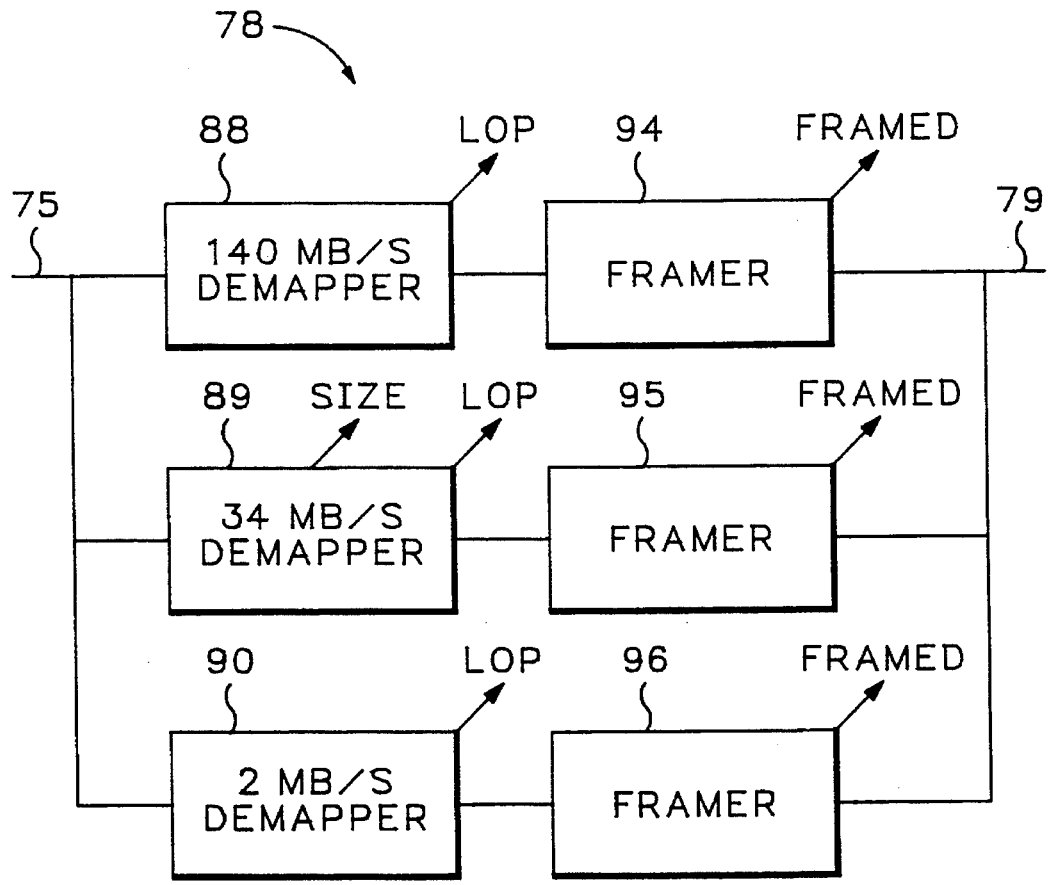
FIGS. 3A and 3B are block diagrams of the VT/TU demapper shown in FIG. 2 for SDH and Sonet environments, respectively.
Figure 3B:
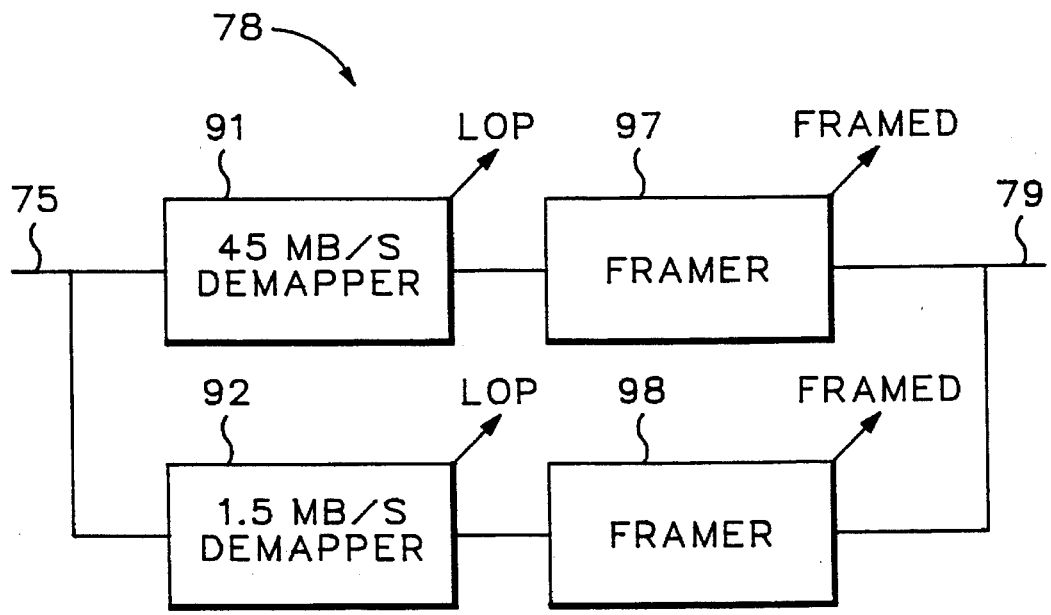

Referring now to FIGS. 3A and 3B, the VT/TU demapper 78 comprises a respective demapper circuit 88–92 and a respective framer 94–98 for each tributary signal rate supported by the instrument 20. An instrument designed for the SDH environment can have a different set of demapper circuits 88–90 than an instrument 20 intended for a Sonet environment. FIG. 3A shows a TU demapper 78 intended for an SDH environment; FIG. 3B shows a VT demapper 78 intended for a Sonet environment.

The demapper circuits 88–92 accept an SPE/VC signal 75 and extract a specified channel. If a demapper circuit 88–92 cannot identify the pointer bytes in the incoming signal 75, it provides a Loss of Pointer (LOP) signal. Of special significance to the SDH 2 Mb/s data rate, the corresponding demapper circuit 90 provides the "size" of the TU signal.

Returning to FIG. 2, a pattern detector 86 receives an extracted channel signal 79 from the demapper 78 and attempts to recognize certain predetermined test patterns, such as pseudo-random binary sequence ("PRBS") $2^{23}-1$, PRBS $2^{20}-1$, PRBS $2^{15}-1$, and PRBS $2^9-1$.

The instrument 20 is controlled by a central processing unit (CPU) 102 having associated random access memory (RAM) 104 and read only memory (ROM) 106. Instruction sequences are stored in the ROM and executed by the CPU. The CPU communicates with the instrument via a system bus 107, issuing commands and receiving results. The CPU 102 also controls the display 22.

The CPU 102 also can communicate with an external computer 115 via a control interface 108. The control interface can be a standard interface, such as a general purpose interface bus (GPIB). The external computer 115 can issue commands 110 to the instrument 20 and receive results 112.

Figure 4:
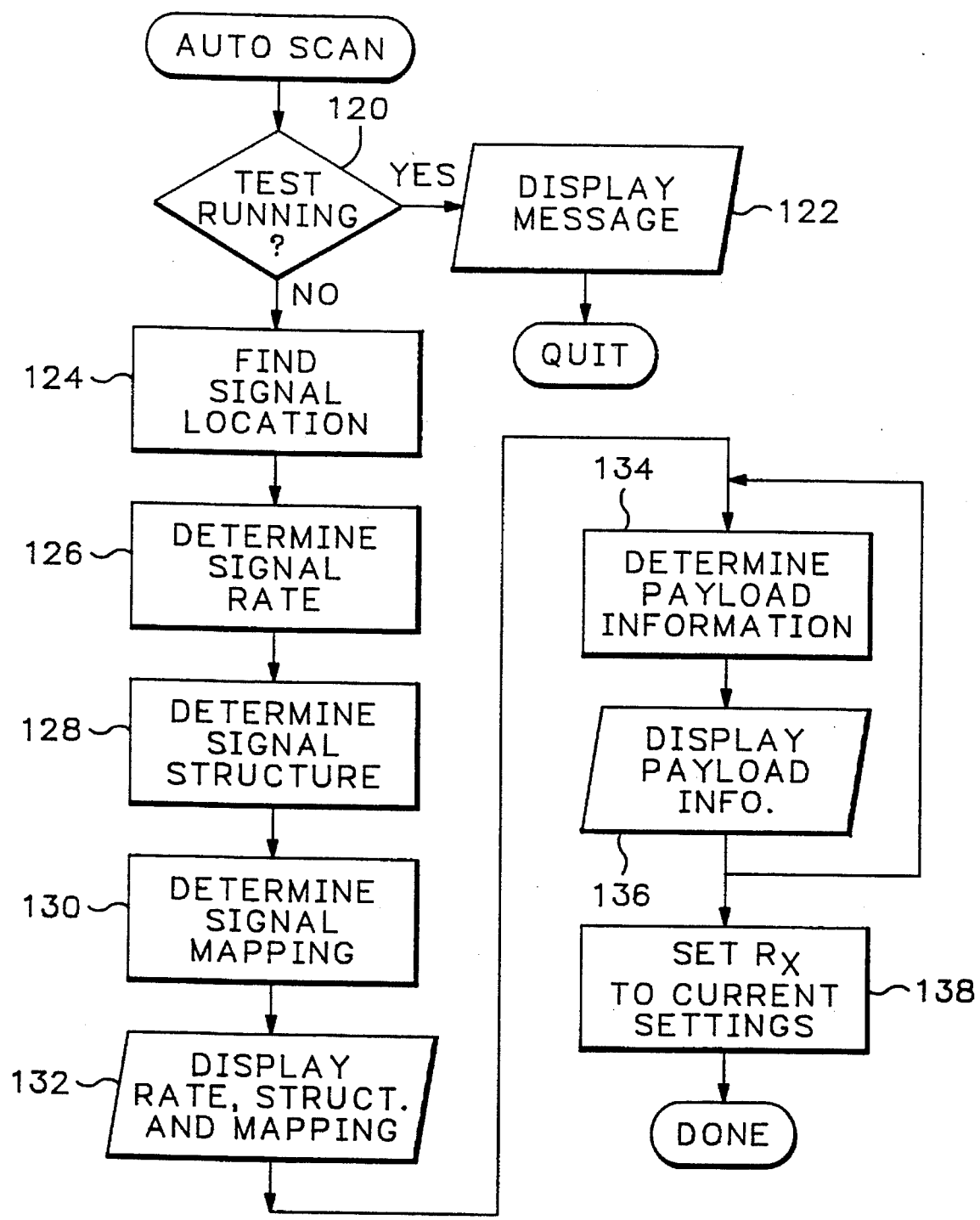
FIG. 4 is a flow chart of a signal recognition and selection method according to the present invention.

Refer now to the flow chart of FIG. 4. If the instrument 20 is running a test, then performing an autoscan would corrupt the results of the test. Thus, as a first step 120, when the user presses the autoscan button 33 on the front panel of the instrument 20, the instrument determines whether a test is running. If so, the instrument 20 displays a dialog box, as step 122, to inform the user that an autoscan cannot be completed while a test is running.

Either the optical receiver connector 34 or the electrical receiver connector 36 can be receiving a Sonet/SDH signal to be analyzed. So, as step 124, the instrument 20 determines which receiver connector is receiving a signal.

Figure 5:
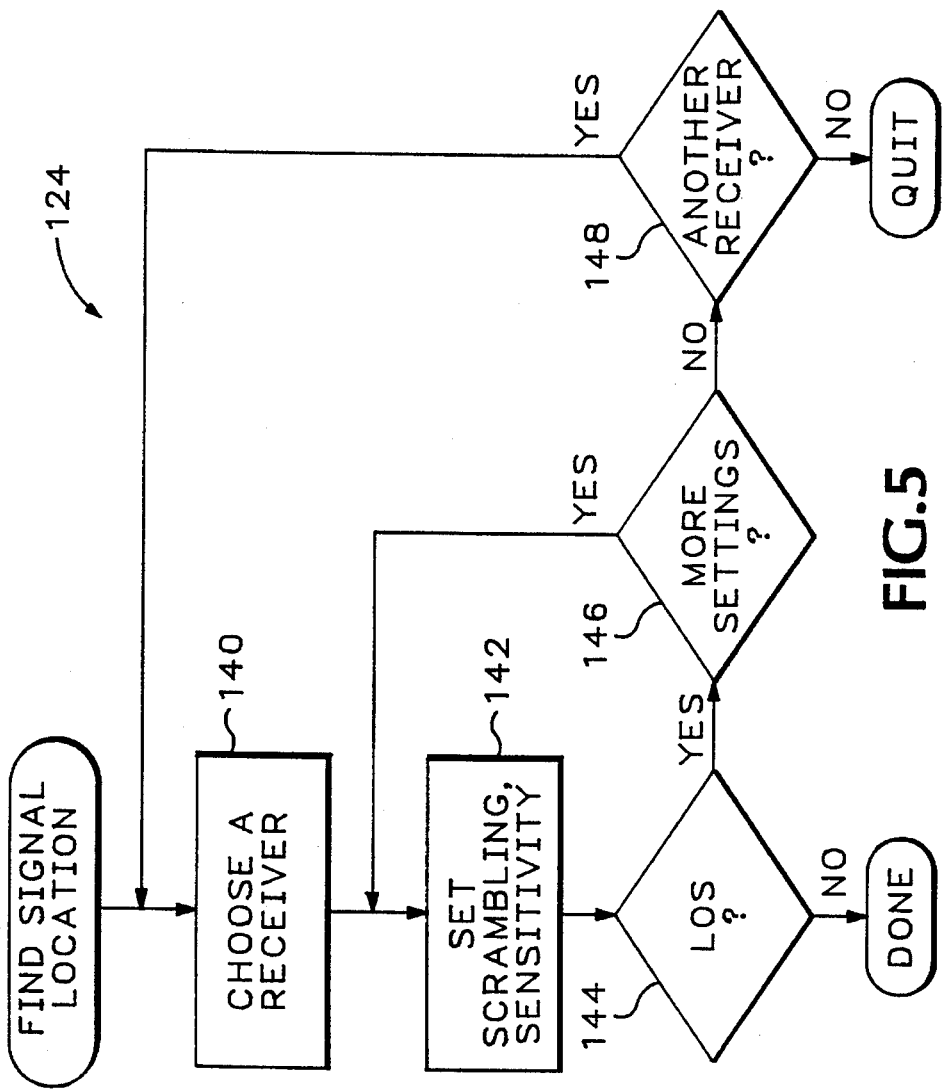
FIG. 5 is a flow chart of a method for finding a signal.

The process of determining which receiver connector is receiving a signal is shown in more detail in FIG. 5. Referring now to FIG. 5, the instrument 20 chooses, as step 140, a physical layer receiver 52, 54 that corresponds to one of the receiver connectors 34, 36. The first receiver chosen by the instrument can correspond to a manual setup selection chosen by the user.

The instrument 20 sets a scrambling setting and a sensitivity setting for the physical layer receiver 52, 54 as step 142, and then checks the receiver for a Loss of Signal (LOS) signal 56, 58, as step 144. If there is no LOS signal, as determined in step 144, then a signal is present at the corresponding signal connector 34, 36 and the Find Signal process shown in FIG. 5 is complete.

Even if step 144 detects an LOS signal, various settings for scrambling and sensitivity must be attempted before concluding that the receiver 52, 54 is not receiving a signal. Thus, as step 146, the instrument 20 determines if there is another setting that should be attempted with the same physical layer receiver 52, 54. If so, then the process continues at step 142 with another setting.

If there are no more settings to attempt, the instrument 20 determines whether both receivers 52, 54 have been analyzed for a signal, as step 148. If so, processing continues at step 140 with the next receiver. If not, and no signal has been found, the Find Signal process is complete. The autoscan process shown in FIG. 4 fails at this point because there is no signal to analyze.

Referring again to FIG. 4, once a signal has been located, as step 126 the instrument 20 determines the signal rate of the signal found in step 124. Thus, the instrument determines the synchronous transport signal level for a Sonet signal or the synchronous transport module level for an SDH signal.

The instrument 20 determines the signal rate by programming the Sonet/SDH framer 62 with various rates and then looking for a Loss of Frame (LOF) signal 64.

Figure 6:
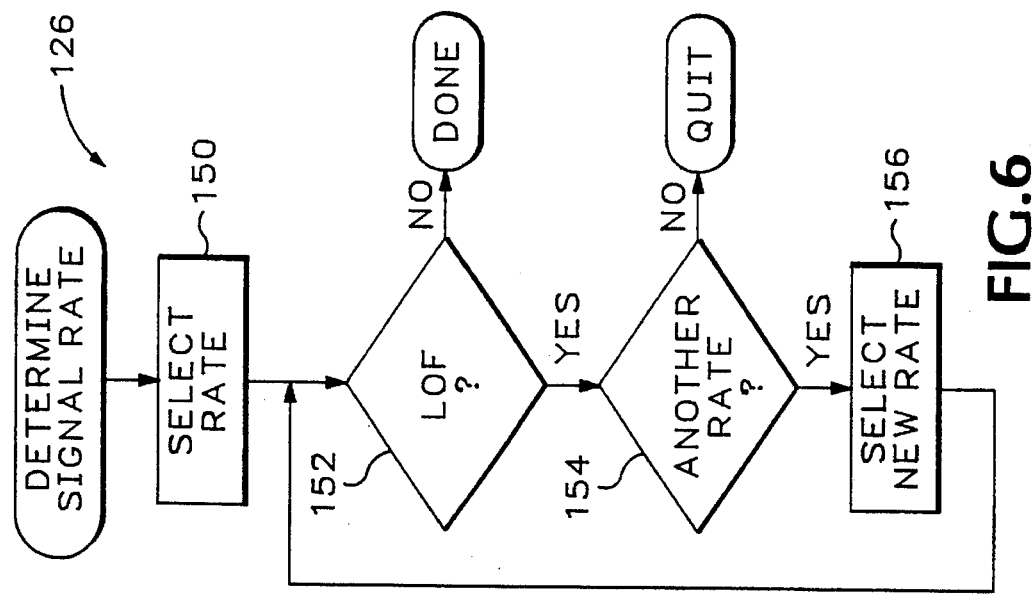
FIG. 6 is a flow chart of a method for determining a signal rate.

Referring now to FIG. 6, the Determine Signal Rate process 126 is shown in more detail. As a first step 150, a Sonet/SDH signal rate is chosen and the framer 62 is programmed to frame at this rate. The first rate chosen can be the highest rate at which the instrument 20 can analyze. Alternatively, the first rate chosen can be a rate manually selected by the user in the receiver setup.

If there is not an LOF signal 64, as detected in step 152, then the correct signal rate has been detected and the Determine Signal Rate process 126 is complete. Otherwise, the instrument 20 checks at step 154 whether there is another rate at which to test.

If there is not another rate, then the signal's rate could not be found and the Determine Signal Rate process 126 quits. The autoscan process must also fail at this point.

If there is another rate, this rate is selected and the framer 62 is programmed to frame at this rate, as step 156. The process then continues at step 152.

Returning to FIG. 4, the next step is determining the structure of the signal, as step 128. For example, with an STS-3 Sonet signal having a rate of 155 Mb/s, this step determines whether the signal comprises an SPE 3*c* structure or three SPE structures.

The signal structure is determined by the pointer processor 70 which analyzes the H1 and H2 pointer bytes in the line overhead.

As a next step 130, the instrument 20 determines the signal payload mappings of the SPE/VC structures. This step is performed by the path overhead processor 74 which returns the C2 byte in the path overhead portion of the signal 73. The mapping is determined for each channel within the Sonet/SDH signal. Sonet mapping is determined according to Table 1.

TABLE 1

Sonet Payload Mapping

| C2 BYTE (HEX) | MAPPING |
| --- | --- |
| 00 | Unequipped |
| 01 | Equipped, Non-Specific |
| 02 | VT Floating Mode |
| 03 | VT Locked Mode |
| 04 | DS3 Asynchronous |
| 05 | DS3 SYNTRAN |
| 13 | ATM |
| 14 | DBDQ |
| 15 | FDDI |
| All Other | Unknown Mapping |

SDH mapping is determined according to Table 2.

TABLE 2

SDH Payload Mapping

| C2 BYTE (HEX) | MAPPING |
| --- | --- |
| 00 | Unequipped |
| 01 | Equipped, Non-Specific |
| 02 | TU Floating Mode |
| 03 | TU Locked Mode |
| 04 | VC-3 With 34 Mb/s |
| 05 | VC-4 With 140 Mb/s |
| 13 | ATM |
| 14 | DBDQ |
| 15 | FDDI |
| All Other | Unknown Mapping |

Figure 7:
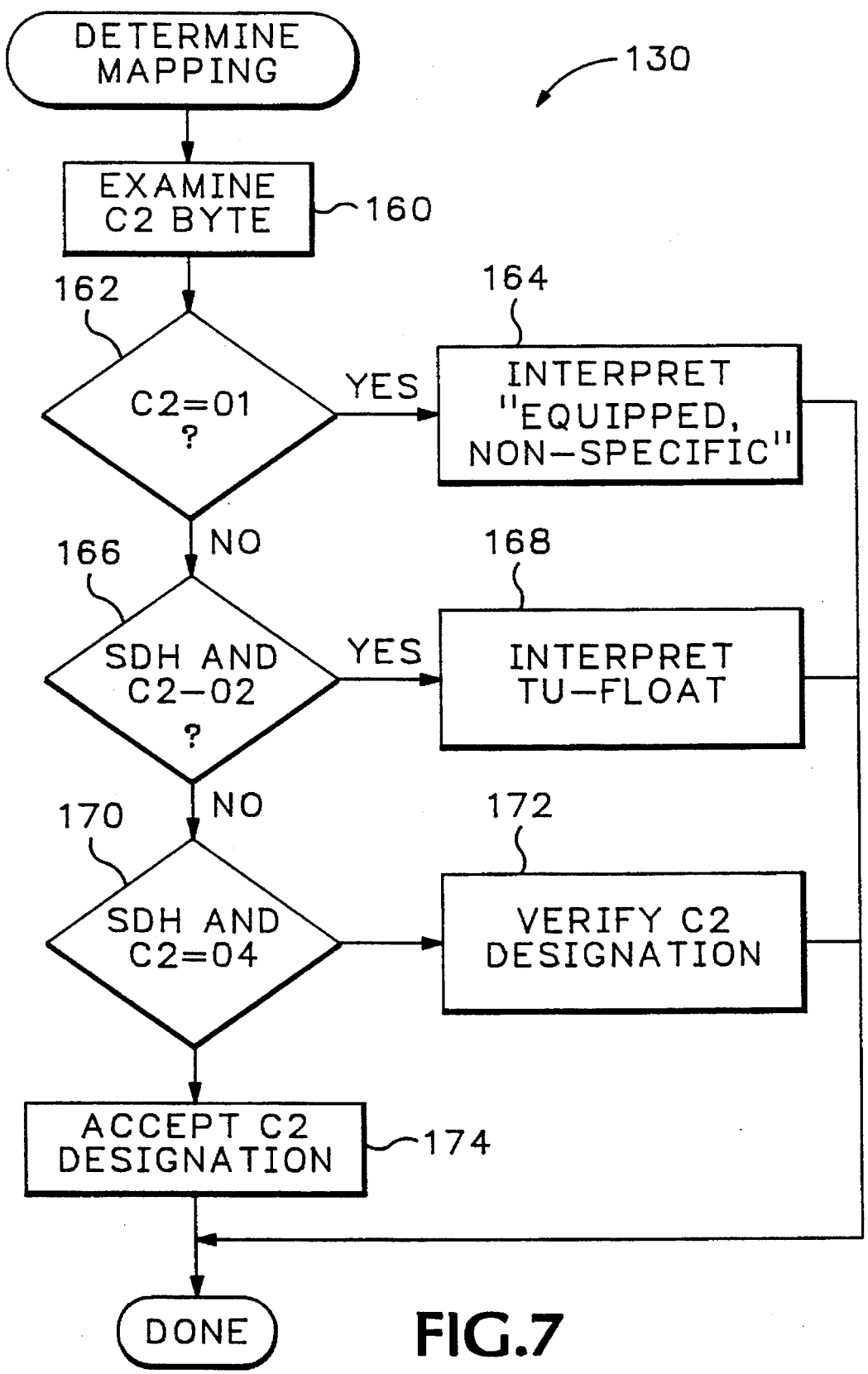
FIG. 7 is a flow chart of a method for determining tributary mapping of a signal.

Referring now to FIG. 7, the instrument 20 determines signal mapping by examining the C2 byte of the path overhead, as step 160. If the C2 byte signifies "Equipped, Non-Specific," determined in step 162, then additional analysis is required to determine the mapping, as step 164.

Likewise, if the C2 byte signifies TU-floating (C2=02 for an SDH signal), as determined in step 166, the mapping can be either TU-4 or TU-3. The instrument 20 performs additional analysis to determine the mapping, as step 168. In the case of C2=02 for a Sonet signal, the instrument assumes a VT1.5 mapping since currently the other mappings are rarely used. If these other mappings become more prevalent in the future, additional processing will be required to determine the size of VT float present.

If the C2 byte signifies VC-3 with 34 Mb/s, the instrument 20 verifies the setting in step 172. This mapping would not be expected in a VC-4 structure.

For all other settings of the C2 byte, the instrument accepts the designation, as step 174.

If the mapping is "Equipped, Non-Specific," then the instrument 20 scans the signal's payload to determine the type of payload mapping that is present on the signal. This scanning is performed by the VT/TU demapper 78 (FIGS. 2–3A, 3B). As shown in FIGS. 3A and 3B, there is a tributary demapper circuit 88–93 for each of the tributary signal types supported by the instrument 20.

The instrument 20 sets up the demapper circuits 88–93 in turn to look at a specific VT/TU channel. Arbitrarily, the first channel may be specified. Upon detecting a LOP signal or an invalid size from a demapper circuit, the instrument proceeds to the next demapper circuit.

Figure 8:
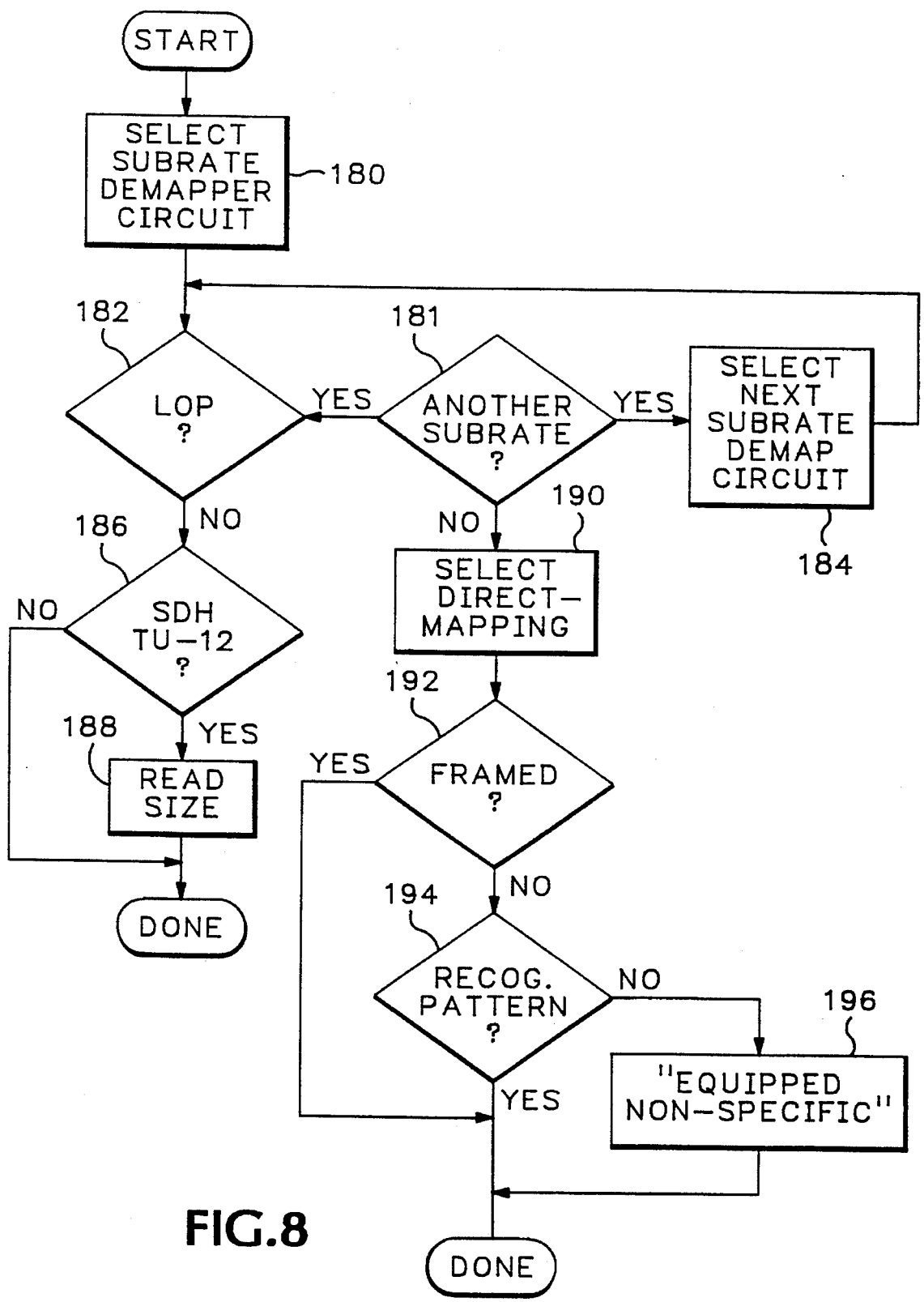
FIG. 8 is a flow chart of a method for interpreting an "Equipped, Non-Specific" payload mapping designation.

Refer now to FIG. 8, which shows a flow chart describing a process of interpreting an "Equipped, Non-Specific" mapping designation. As a first step 180, the instrument 20 programs a sub-rate demapper circuit 89, 90, 92 to extract the first VT/TU channel from the SPE/VC signal 75. ("Sub-rate" is used to refer to a tributary signal rate.) Upon detecting a Loss of Pointer (LOP) signal, as step 182, the instrument 20 determines if there is another sub-rate demapper circuit yet to try, as step 181. If so, the instrument 20 selects the next demapper circuit, as step 184, and continues at step 180.

A TU-2 signal does not cause a TU-12 demapper circuit 90 to provide an LOP signal. Thus, the instrument 20 also checks the "size" designation from the TU-2 demapper as steps 186, 188. The "size" indicates whether the input signal 75 is a TU-2 signal or a TU-12 signal.

If all of the sub-rate demapper circuits 89, 90, 92 have been tried without success, as determined in step 181, then the direct-mapped demapper circuit 88, 91 is selected, as step 190. The instrument 20 is designed for either SDH or Sonet operation and thus would have either the 140 Mb/s SDH demapper circuit 88 or the 45 Mb/s Sonet demapper circuit 92. If the corresponding framer 94, 97 indicates a "framed" status, determined as step 192, then the appropriate mapping has been determined.

An unframed signal is also possible. To check for this possibility, the output of the demapper 78 (FIG. 2) is provided to the pattern detector 86. The pattern detector attempts to detect one of its preprogrammed pseudorandom bit sequences pattern, such as PRBS $2^{23}-1$, in the signal, as step 194. Upon finding a match, the mapping is determined. Otherwise, the mapping of the input signal 75 remains "Equipped, Non-Specific," as step 196.

In the case of a SDH instrument 20, a "TU-floating" mapping designation by the C2 byte can mean either a TU-3 or a TU-12 mapping. To determine which mapping is present on the input signal 75, the instrument 20 tries, as step 168 (FIG. 7), the 34 Mb/s demapper circuit 89 and the 2 Mb/s demapper circuit 90 as described above in interpreting the "Equipped, Non-Specific" designation.

Figure 9:
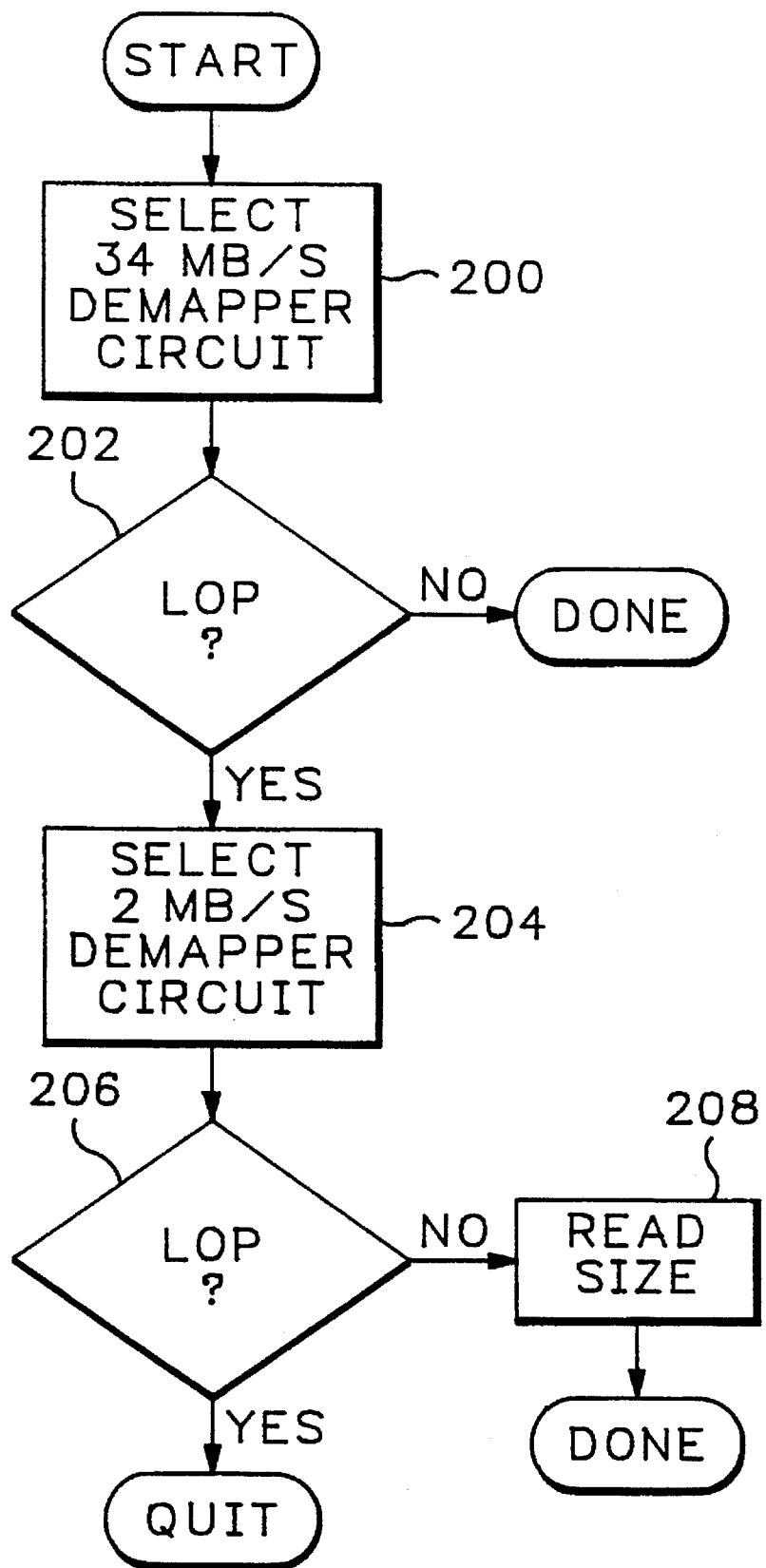
FIG. 9 is a flow chart of a method for interpreting a "TU Floating" payload mapping designation.

Referring now to FIG. 9, the "Interpret TU-Float" process 168 (FIG. 7) is shown in more detail. The instrument 20 selects the 34 Mb/s demapper circuit 89 as step 200 and looks for a Loss of Pointer (LOP) signal. If there is no LOP signal, determined in step 202, then the correct mapping has been found. Otherwise, the 2 Mb/s demapper circuit 90 is selected, as step 204. If there is no LOP signal, determined in step 206, and the size designation is correct, determined in step 208, then the mapping has been found.

If a "VC-3 with 34 Mb/s" designation appears within a VC-4 structure, the instrument 20 verifies the mapping as though the C2 byte had indicated a "TU-floating" mapping. Thus, the process shown in FIG. 9 and discussed above is performed.

Returning to FIG. 4, the mapping for each structure must be determined. Thus, steps 130 and 132 are performed for each structure in the signal.

Thus, the signal's location, rate, structure, and mappings for each structure have been determined. As a next step 132, the instrument 20 shows on the display 22 the signal location, structure, and mapping.

Figure 10:
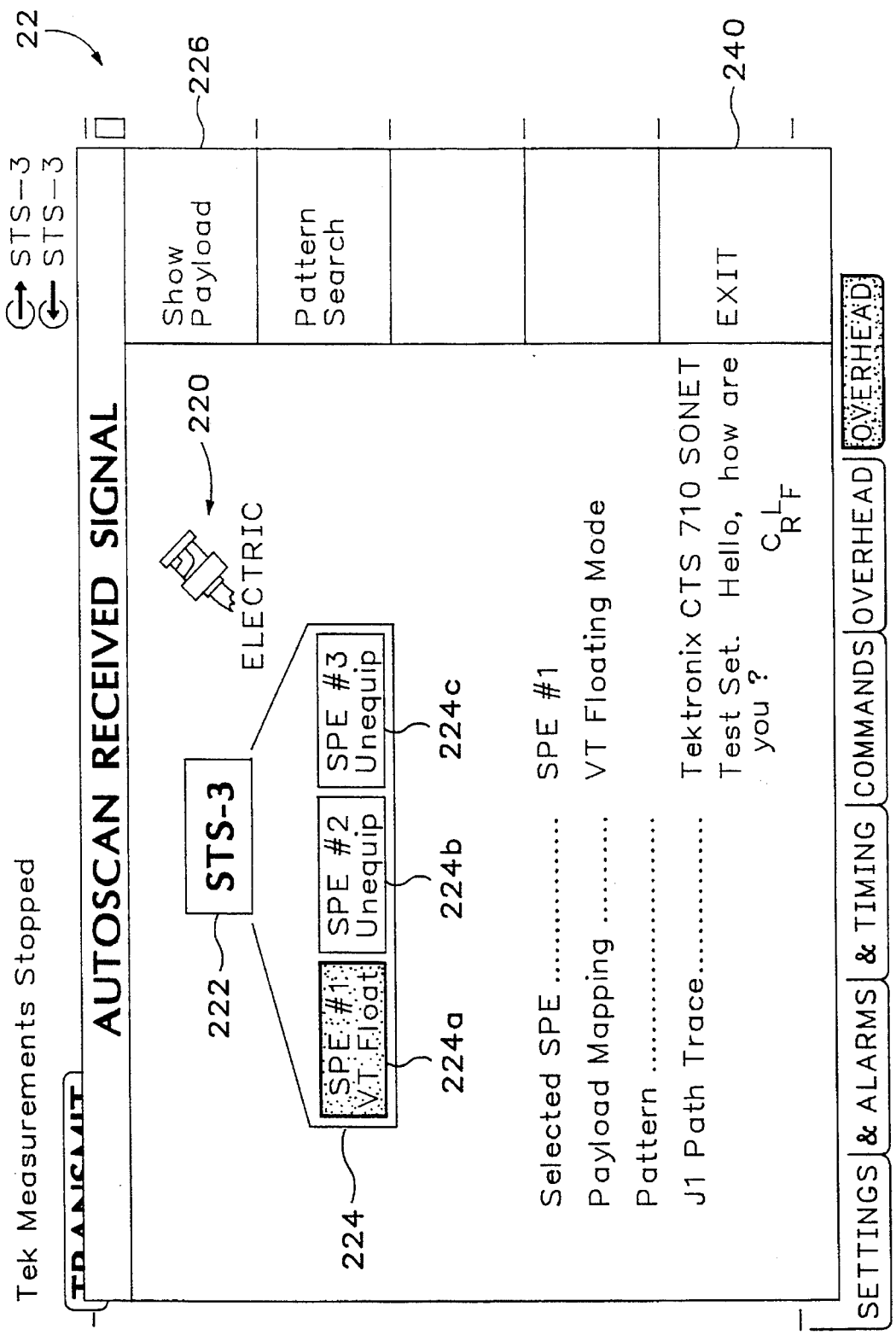
FIG. 10 is an exemplary graphical display of the structure and mapping of a Sonet/SDH signal.

Refer now to FIG. 10, where an exemplary display is shown. The location of the signal determined in step 124

(FIG. 4) is displayed with a graphic and label 220 in the upper-right portion of the display 22. In this case, the signal was found on the electrical connector 36 (FIG. 1).

The rate of the signal rate determined in step 126 (FIG. 4) is displayed with a box 222 containing the STS-N/STM-N designation. In the exemplary display, the signal is an STS-3 signal having a corresponding rate of 155 Mb/s.

Below this box is an array of boxes 224 displaying the structure and mapping of the signal. In the exemplary display, the structure has three synchronous payload envelopes (SPE). The first SPE 224a has a "VT Floating" mapping. The second and third SPEs 224b, 224c have "Unequipped" mappings.

Below the structure and mapping boxes 222, 224, the instrument 20 displays additional information about the selected SPE/VC. The selected SPE/VC is indicated by highlighting in the display. The other SPE/VC structures can be selected by turning the knob 30. In the exemplary display, the first SPE 224a is selected and the instrument 20 shows the payload mapping, any recognized binary pattern, and the J1 path trace.

To obtain further information on a specific SPE/VC, the highlights the appropriate box in the structure array 224 and pushes the button 24 adjacent the "Show Payload" label 226 on the display 22.

Referring again to FIG. 4, the instrument selects the first channel of the selected SPE/VC structure and determines any relevant payload information, as step 134.

Figure 11:
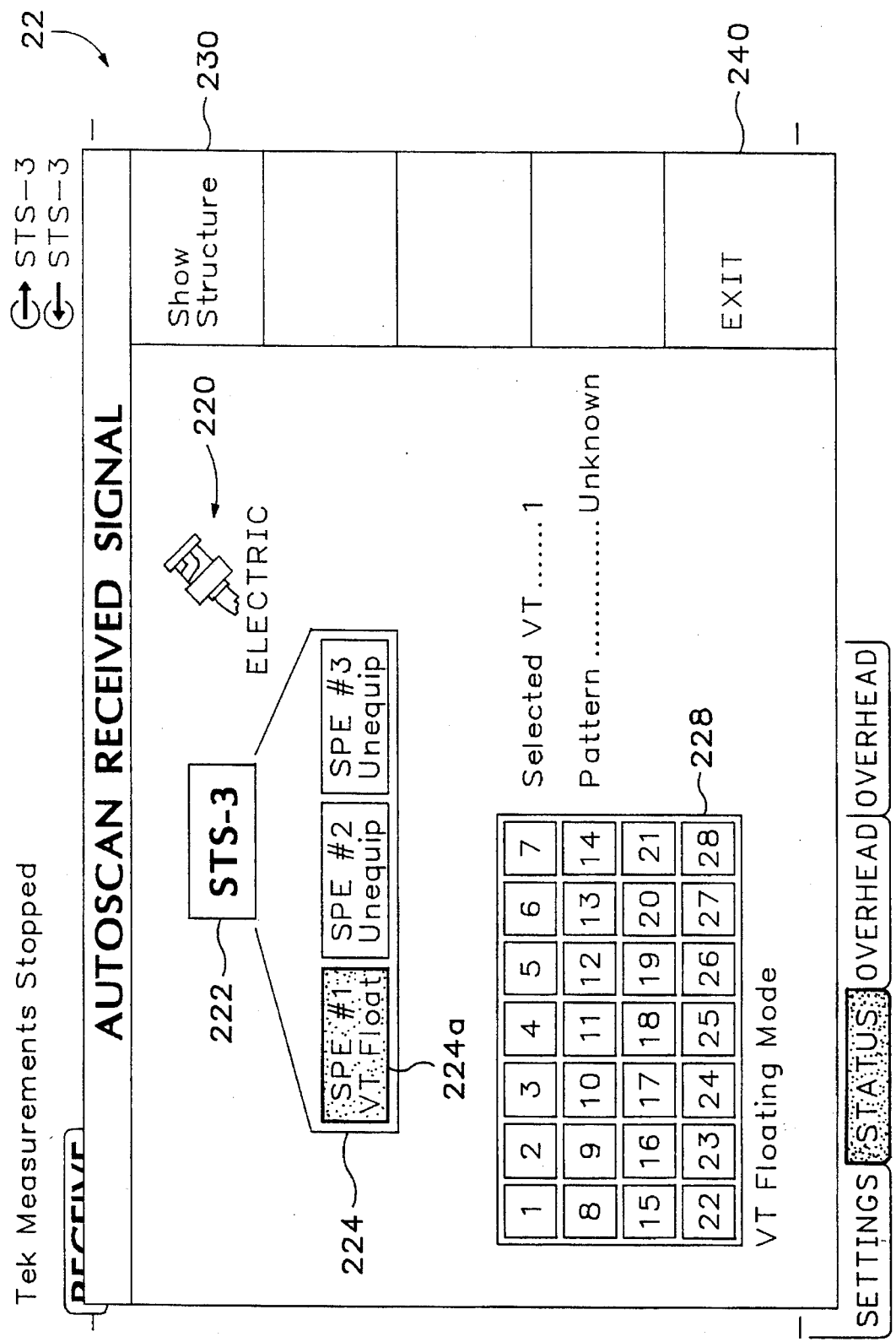
FIG. 11 is an exemplary graphical display of the structure and mapping of a Sonet/SDH signal and the payload of a selected SPE/VC within the signal.

The display 20 then changes to display additional information about the selected SPE/VC structure. Referring now to FIG. 11, a graphical array of channels 228 is displayed at the bottom-left portion of the display 22. The channel numbers are shown in individual boxes.

To the right of the graphical array 228 is selected information about the channel. The user may select other channels by rotating the input knob 30.

In the exemplary display 22 of FIG. 11, the channels number and any recognized binary pattern are displayed. The type of framing and a path trace, if appropriate for the type of mapping, may also be displayed.

Additionally, the status indicators 28 display any alarms or error conditions relevant to the selected signal, SPE/VC structure, and channel.

While displaying information about a selected channel, the instrument may be collecting information on the other channels. This additional information may be displayed in the boxes in textual, graphical, or iconic form. For example, a smiling face icon within a specific channel's box could indicate that there are no alarms active for that channel. A frowning face icon could indicate the presence of one or more alarms. A grayed box could indicate an empty channel.

The payload information is determined by the demapper 78 and pattern detector 86 (FIG. 2).

When the user presses the button 24 adjacent the "EXIT" label 240 on either of the autoscan displays shown in FIGS. 10–11, the autoscan process is exited. The receiver of the instrument 20 remains set to the signal location, structure, mapping, and channel last selected by the user in the autoscan process, shown as step 138 on FIG. 4.

The invention as described above comprises an instrument using internal control to perform a signal recognition and selection process. Thus the CPU 102 executes a sequence of instructions stored on the ROM 106 (FIG. 2).

The present invention includes having an external computer 115 control the instrument 20 through the control interface 108. The method shown in the flow charts of FIGS. 4–9 would be executed by the external computer 115. The various elements in the instrument would perform the same functions described above, with the difference being that they would be receiving their commands from the computer and they would be reporting their results to the computer.

The terms and expressions which have been employed in the foregoing specification are used therein as terms of description and not of limitation, and there is no intention, in the use of such terms and expressions, of excluding equivalents of the features shown and described or portions thereof, it being recognized the scope of the invention is defined and limited only by the claims which follow.

What is claimed is:

1. A method for configuring a measurement test instrument for analyzing an input Sonet/SDH signal, the signal having section, line and path overheads, a signal rate and at least one signal structure, the method comprising the steps of:

(a) detecting the presence of the input Sonet/SDH signal in a physical layer receiver configurable with scrambling and sensitivity settings;

(b) determining the signal rate for the detected input Sonet/SDH signal by setting a framer at various frame rates for detecting a framed input Sonet/SDH signal with the framed input signal being a function of the signal structure;

(c) determining the signal structure for the framed input Sonet/SDH signal; and (d) determining a mapping structure of the framed input Sonet/SDH signal.

2. The method of claim 1, and wherein the step of determining the signal structure of the framed input Sonet/SDH signal includes examining "H1" and "H2" bytes of the line overhead.

3. The method of claim 1, further comprising the step of displaying the signal rate, the signal structure and the structure mapping of the framed input Sonet/SDH signal.

4. The method of claim 3 wherein the framed input Sonet/SDH signal has more than one signal structure, the steps further comprising accepting user input for selecting one of the displayed signal structures.

5. The method of claim 3 further comprising the step of displaying a graphical array representative of signal channels within the mapping structure of the signal structure of the framed input Sonet/SDH signal.

6. The method of claim 3 further comprising the step determining a payload mapping structure for a channel signal within the mapping structure of the signal structure of the framed input Sonet/SDH signal.

7. The method of claim 6 wherein the step of determining a payload mapping structure further comprising the steps:

(a) coupling the channel signal to one of a number of demapper circuits;

(b) monitoring the one of a number of demapper circuits for a loss of pointer or an invalid size in the channel signal;

(c) coupling the channel signal to one of the other demapping circuits when a loss of pointer or an invalid size is detected;

(d) repeating steps (a),(b), and (c) for the other demapper circuits while a loss of pointer or invalid size is detected;

(e) coupling the channel signal to a framer when a pointer or valid size is detected in the demapper; and (d) determining a framed or unframed status for the channel signal.

8. The method of claim 7 wherein the step of determining a framed or unframed status for the channel signal further comprises the steps of:
   (a) coupling the channel signal to a pattern detector when an unframed status is detected;
   (b) coupling one of a number of pseudorandom bit pattern sequences to the pattern detector;
   (c) comparing the channel signal to the pseudorandom bit pattern sequence for a match;
   (d) coupling another of the pseudorandom bit pattern sequences to the pattern detector for comparing with the channel signal when a match is not detected;
   (e) repeating steps (b),(c) and (d) for the other pseudorandom bit pattern sequences when a match is not detected; and
   (f) displaying the pseudorandom bit pattern sequences when a match is detected.

9. The method of claim 8 further comprising the step of displaying the payload mapping structure for the channel within the mapping structure of the signal structure of the framed input Sonet/SDH signal.

10. The method of claim 6 further comprising accepting user input for selecting one of the displayed channels within the mapping structure of the signal structure of the framed input Sonet/SDH signal.

11. The method of claim 1 wherein the detecting step further comprises the steps of:
   (a) configuring the physical layer receiver with scrambling and sensitivity settings;
   (b) monitoring the physical layer receiver for loss of signal at the scrambling and sensitivity settings;
   (c) repeating steps (a) and (b) with different scrambling and sensitivity settings if a loss of signal is detected;
   (d) terminating the configuration of the measurement test instrument if a loss of signal is detected at the different scrambling and sensitivity settings for the physical layer receiver.

12. The method of claim 11 wherein the measurement test instrument has more than one physical layer receiver, the steps further comprising:
   (a) configuring another physical layer receiver with scrambling and sensitivity settings if a loss of signal is detected at the different scrambling and sensitivity settings in the previously configured physical layer receiver;
   (b) monitoring the another physical layer receiver in step (a) for loss of signal at the scrambling and sensitivity settings;
   (c) repeating steps (a) and (b) with different scrambling and sensitivity settings if a loss of signal is detected;
   (g) repeating steps (a), (b) and (c) for additional physical layer receivers; and
   (h) terminating the configuration of the measurement test instrument if a loss of signal is detected at the different scrambling and sensitivity settings for the physical layer receivers.

13. The method of claim 1 wherein the step of determining the mapping structure of the framed input Sonet/SDH signal includes examining a "C2" byte of the path overhead.

14. A configurable measurement test instrument for analyzing an input Sonet/SDH signal at its correct signal rate, said signal having section, line and path overheads and at least one signal structure, said instrument comprising:
   (a) at least a first physical layer receiver configurable with scrambling and sensitivity settings for receiving the input Sonet/SDH signal;
   (b) a programmable Sonet/SDH framer coupled to receive the input Sonet/SDH signal from the physical layer receiver for detecting a framed input signal by setting the framer at various frame rates for determining a signal rate with the framed input signal being a function of the signal structure;
   (c) a pointer processor adapted to read selected bytes of the line overhead for determining the signal structure of the framed input signal;
   (d) a path overhead processor adapted to read a selected byte of the path overhead for determining a mapping structure of the framed input signal; and
   (e) digital control means for controlling the framer, the pointer processor, and the path overhead processor, whereby the digital control means commands the framer to receive the Sonet/SDH signal at different rates until a framed input signal is detected for determining the signal rate of the Sonet/SDH signal, and whereby the digital control means receives the selected bytes from the pointer processor for determining the signal structure of the Sonet/SDH signal, and whereby the digital control means receives the selected byte from the path overhead processor for determining a mapping structure of the framed input signal.

15. The measurement test instrument of claim 14, further comprising a display controlled by the digital control means, wherein the digital control means causes the display to show the signal rate, the signal structure and the mapping structure of the Sonet/SDH signal.

16. The measurement test instrument of claim 15, further comprising a user input means for enabling a user to select one of the signal structures.

17. The measurement test instrument of claim 14 wherein the physical layer receiver further comprises an electrical physical layer receiver and an optical physical layer receiver.

18. The measurement test instrument of claim 14 further comprising a demapper for determining a payload mapping structure for a signal channel within the mapping structure of the framed input signal.

19. The measurement test instrument of claim 18 further comprising a pattern detector coupled to the demapper for receiving the channel signal and pseudorandom bit sequence patterns for determining the payload mapping structure for an unframed channel signal within the mapping structure of the framed input signal as a function of detecting a match between the unframed channel signal and the pseudorandom bit sequence patterns.

20. The measurement test instrument of claim 14 further comprising a display controlled by the digital control means, wherein the digital control means causes the display to show the payload mapping structure of the channels.

21. The measurement test instrument of claim 20 further comprising a user input means for enabling a user to select one of the signal channels.

* * * * *